(12) United States Patent
Yamane et al.

(10) Patent No.: US 6,481,509 B1
(45) Date of Patent: Nov. 19, 2002

(54) IMPACT GENERATOR

(75) Inventors: Yoshiro Yamane, Akashi (JP);
Kazuhiko Takemoto, Kakogawa (JP);
Tadao Yashirodai, Kakogawa (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 09/553,680

(22) Filed: Apr. 21, 2000

(30) Foreign Application Priority Data

Apr. 26, 1999 (JP) ............................................ 11-118616

(51) Int. Cl.$^7$ ................................................ B25D 9/08
(52) U.S. Cl. ...................... 173/212; 173/94; 173/205
(58) Field of Search ................................ 173/205, 210, 173/212, 94, 128, 98

(56) References Cited

U.S. PATENT DOCUMENTS

| | | | | |
|---|---|---|---|---|
| 1,215,056 A | * | 2/1917 | Pauli | 173/98 |
| 1,824,935 A | * | 9/1931 | Thompson | 173/98 |
| 2,341,438 A | * | 2/1944 | Gossling | 173/94 |
| 3,127,941 A | * | 4/1964 | Sieber | 173/205 |
| 3,486,569 A | * | 12/1969 | Sieber | 173/98 |
| 5,002,134 A | * | 3/1991 | Yamada | 173/94 |
| 5,488,997 A | * | 2/1996 | Yamada | 173/205 |

FOREIGN PATENT DOCUMENTS

| | | |
|---|---|---|
| DE | 3405980 A1 | 2/1984 |
| JP | 7-164351 | 6/1995 |
| JP | 09/193046 | 7/1997 |

* cited by examiner

*Primary Examiner*—Scott A. Smith
(74) *Attorney, Agent, or Firm*—Oppenheimer, Wolff & Donnelly LLP (57) ABSTRACT

In a conventional impact generator, a great shock is generated when a weight collides with a rotary member, and a rotary shaft of the rotary member and a bearing supporting the rotary shaft receive the great shock. Therefore, it is necessary to employ a bearing having a great load capacity. Furthermore, great vibrations and noises are also generated in the impact generator. A rotary member (10) is rotatably supported by rotary shafts (11) and (12). A weight (30) is movably held by the rotary member (10). A shock absorber (40) for absorbing, by elastic force, a shock generated between the weight (30) and the rotary member (10) is provided between the weight (30) and the rotary member (10).

2 Claims, 5 Drawing Sheets

IMPACT GENERATOR

BACKGROUND OF THE INVENTION

1. Field of the Invention

The invention relates to an impact generator for rotating a weight by means of a rotary member and striking a struck member with the weight, thereby continuously generating impact force for working.

2. Description of the Related Art

An impact generator is a device for continuously generating impact force (shock force). Such impact generator may be applied to a crusher for crushing concrete or hardened asphalt in a road construction, a building site and the like, a reaper for cutting off fruit and branches of plants, and a root cutter for cutting off roots of plants, for example.

Figure 5A:
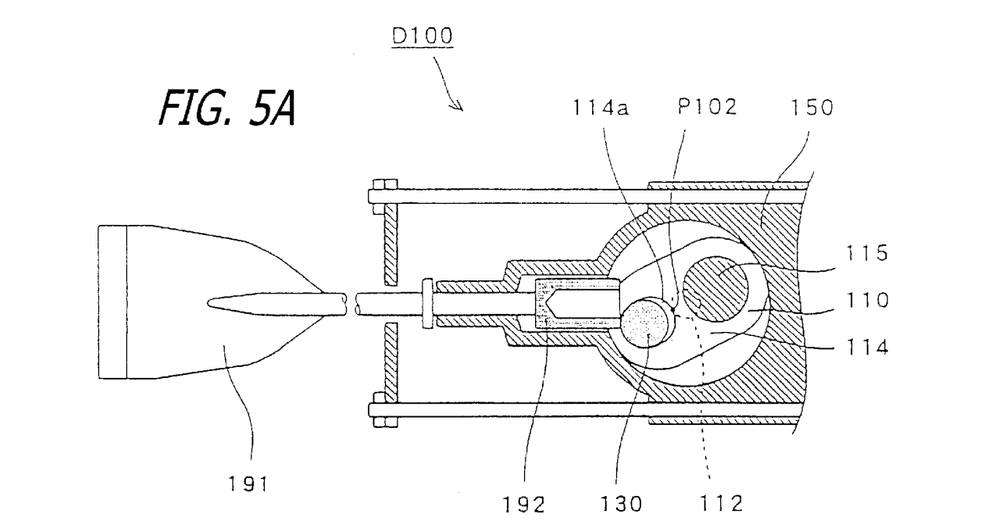
FIG. 5A is a transverse sectional view showing an impact generator according to the prior art.
Figure 5B:
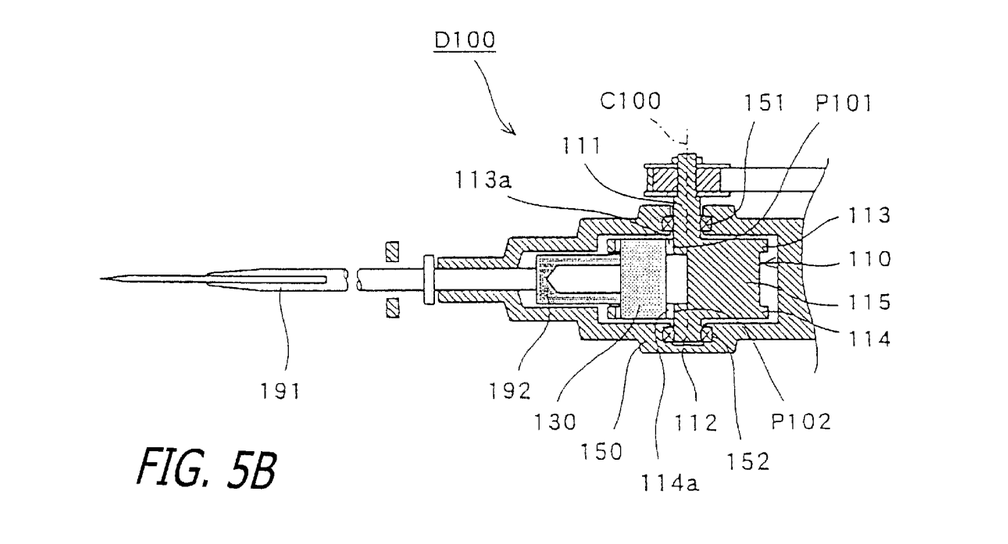
FIG. 5B is a longitudinal sectional view showing the impact generator according to the prior art.

By way of example, Japanese Laid-Open Patent Publication No. Hei 7-164351 has disclosed an impact generator according to the prior art. FIG. 5A is a transverse sectional view showing the impact generator D100 according to the prior art and FIG. 5B is a longitudinal sectional view showing the impact generator D100 according to the prior art. The impact generator D100 is applied to a reaper and serves to give continuous impact force to a cutting blade 191. The impact generator D100 converts rotating force transmitted from a power unit such as an engine into reciprocating impact force and transmits the reciprocating impact force to the cutting blade 191.

As shown in FIGS. 5A and 5B, the impact generator D100 comprises a rotary member 110 and a weight 130. The rotary member 110 is rotatably supported in a casing 150 by means of rotary shafts 111 and 112. The rotary member 110 has plate-shaped holding portions 113 and 114. The plate-shaped holding portions 113 and 114 are connected to each other through a connecting shaft portion 115. The connecting shaft portion 115 is positioned eccentrically from a center C100 of rotation of the rotary member 110. Elliptical holes 113a and 114a are formed on the plate-shaped holding portions 113 and 114, respectively. A cylindrical weight 130 is held in the holes 113a and 114a. The holes 113a and 114a have diameters which are larger than the diameter of the weight 130. Therefore, the weight 130 can freely move to some extent in the holes 113a and 114a. More specifically, the weight 130 is movably held by the rotary member 110.

When the weight 130 performs a circular motion around the rotary shafts 111 and 112 of the rotary member 110 by the rotation of the rotary member 110, the top of a tappet 192 positioned to interfere with the locus of the circular motion is struck with the weight 130. The tappet 192 is supported movably in an axial direction thereof (in a right and left direction in FIGS. 5A and 5B). Therefore, the tappet 192 is struck, thereby giving an impact to the cutting blade 191 positioned on the left of the tappet 192 in FIGS. 5A and 5B. Thus, when the rotary member 110 is rotated, continuous impact force is given to the cutting blade 191.

In the above-mentioned impact generator D100, the tappet 192 is struck with the weight 130, thereby generating the impact force. However, when the tappet 192 is struck with the weight 130, the weight 130 receives a reaction in a direction toward the center C100 of rotation of the rotary member 110 from the tappet 192. Then, the weight 130 collides with points P101 and P102 on internal walls defining the holes 113a and 114a which are the closest to the center C100 of rotation. By the collision, the rotary shafts 111 and 112 supporting the rotary member 110 and bearings 151 and 152 supporting the rotary shafts 111 and 112 receive a shock. Accordingly, the load capacities of the bearings 151 and 152 should be increased.

By the collision, moreover, great vibrations are also given to a machine (a reaper or the like) to which the impact generator is applied. Further for this reason, great noises are made in some cases.

SUMMARY OF THE INVENTION

In consideration of above-mentioned circumstances, it is an object of the invention to relieve a shock to be given to a rotary shaft of a rotary member and a bearing supporting the rotary shaft.

In order to solve the above-mentioned problems, the invention provides an impact generator comprising a rotary member rotatably supported by a rotary shaft for being rotated upon receipt of rotating force, a weight movably held by the rotary member for striking a struck member, and a shock absorber provided between the weight and the rotary member for absorbing, by elastic force, a shock generated between the weight and the rotary member.

According to the impact generator described above, the shock force generated between the weight and the rotary member is absorbed by the shock absorber. Consequently, the shock to be given to the rotary member can be relieved. Accordingly, it is also possible to relieve the shocks to be given to the rotary shaft supporting the rotary member and a bearing supporting the rotary shaft.

The shock absorber can be provided in any configuration if it is provided between the weight and the rotary member to absorb the shock therebetween. For example, the rotary member may have two plate-shaped holding portions provided in almost parallel with each other for holding the weight, and a connecting shaft portion for connecting the two plate-shaped holding portions in a position which is eccentric from the center of rotation of the rotary member, and the shock absorber may be provided between the weight and the connecting shaft portion.

Moreover, any shock absorber capable of absorbing a shock by elastic force can be employed. For example, the shock absorber may be constituted by a coil spring, and a supporting hole may be formed in the connecting shaft portion of the rotary member, fitting one of ends of the coil spring therein to support the coil spring.

These objects as well as other objects, features and advantages of the invention will become more apparent to those skilled in the art from the following description with reference to the accompanying drawings.

DETAILED DESCRIPTION OF THE PREFERRED EMBODIMENT

An embodiment of the invention will be described below with reference to the drawings.

Figure 1:
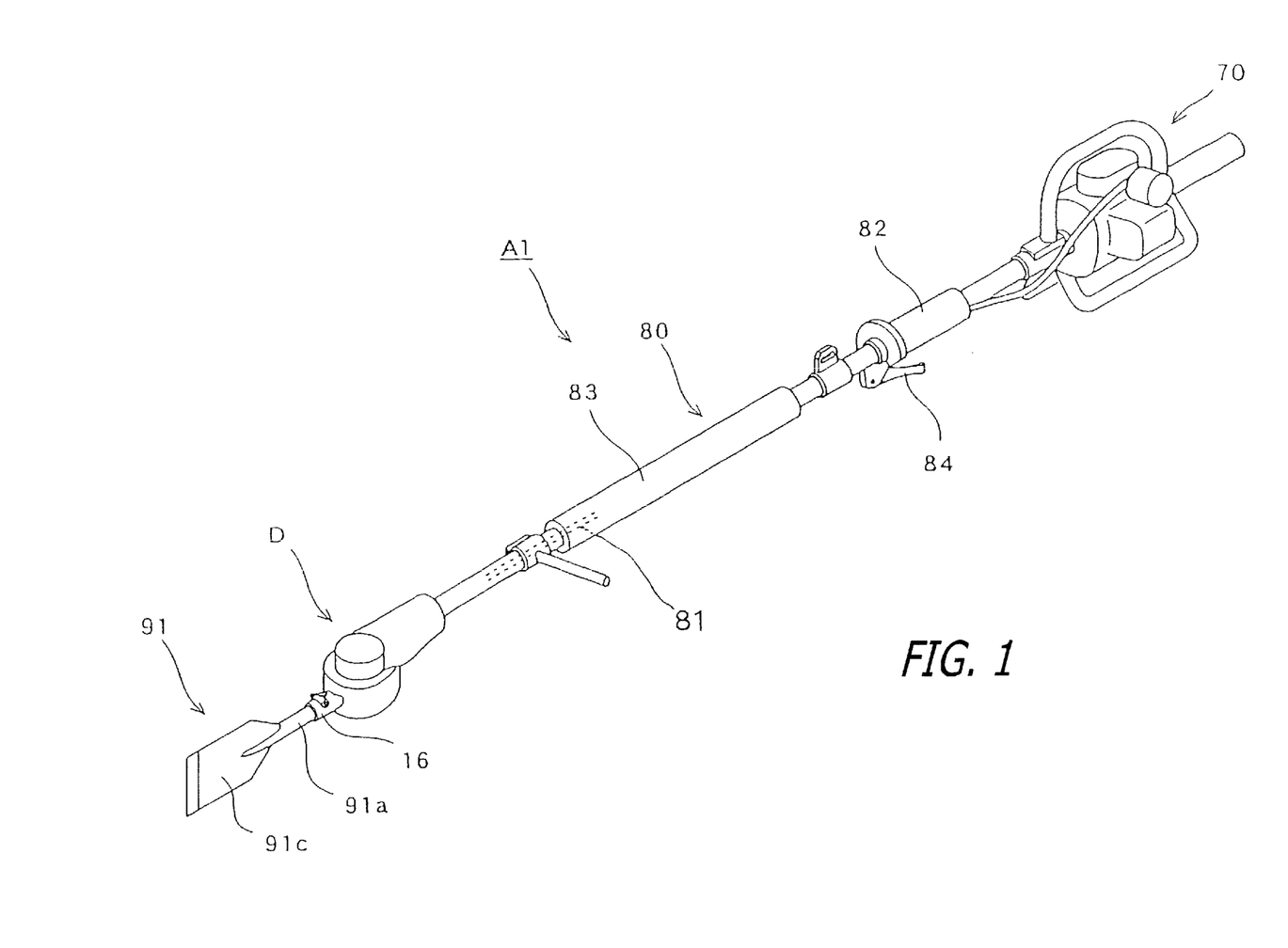
FIG. 1 is a perspective view showing a reaper employing an impact generator according to a preferred embodiment of the invention.

An impact generator according to the invention can be applied to a reaper, a root cutter, a crusher and the like, for example. FIG. 1 is a perspective view showing a reaper A1. An impact generator D according to an embodiment of the invention is applied to the reaper A1.

First of all, the basic structure of the reaper A1 will be described with reference to FIG. 1. The reaper A1 comprises an engine 70 acting as a power unit, a rod member 80, the impact generator D, a cutting blade 91, and the like.

The engine 70 generates rotating force.

The rod member 80 connects the engine 70 to the impact generator D. The rod member 80 is constituted by a hollow pipe in which a drive shaft 81 penetrates. The rotating force generated by the engine 70 is transmitted to the impact generator D by the drive shaft 81 penetrating the rod member 80.

The impact generator D converts the rotating force generated by the engine 70 into continuous striking force (impact force) of reciprocating.

The cutting blade 91 is formed by welding a plate-shaped blade portion 91c to a shank portion 91a. The shank portion 91a is inserted into a blade attaching portion 16 of the impact generator D. The shank portion 91a is attached to the blade attaching portion 16 such that it can be displaced in the longitudinal direction of the reaper A1 by a predetermined length. The shank portion 91a receives a periodic impact by the striking force generated by the impact generator D through a tappet 92 (refer FIGS. 3A and 3B). The impact is directed from the shank portion 91a toward the edge of the plate-shaped blade portion 91c.

A first grip portion 82 and a second grip portion 83 are formed in the rod member 80 of the reaper A1, and an operation lever 84 is attached adjacently to the first grip portion 82. The operation lever 84 serves to control the speed of the engine 70. The engine 70 and the drive shaft 81 penetrating the rod member 80 are connected to each other through a centrifugal clutch. When the operation lever 84 is released to bring the engine 70 into an idling state, the centrifugal clutch is brought into a disconnecting state so that the rotating force of the engine 70 is not transmitted to the impact generator D. When the operation lever 84 is gripped more tightly, the engine speed of the engine 70 is gradually increased so that the centrifugal clutch is connected. Consequently, the impact generator D starts to give a periodic impact to the shank portion 91a of the cutting blade 91. When the operation amount of the operation lever 84 is further increased, the engine speed of the engine 70 is increased so that an impact cycle (striking cycle) is shortened.

Also in the case where the impact generator according to the invention is applied to a root cutter, a basic structure thereof is the same as in the reaper A1.

Figure 2A:
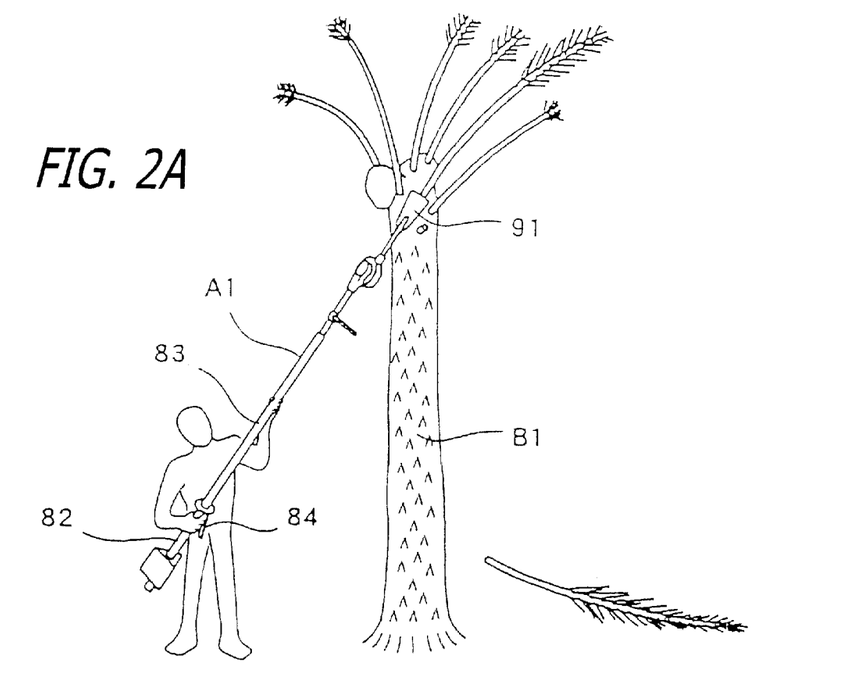
FIG. 2A is a view showing a state in which fruit and branches of an oil palm are cut off by the reaper of FIG. 1.
Figure 2B:
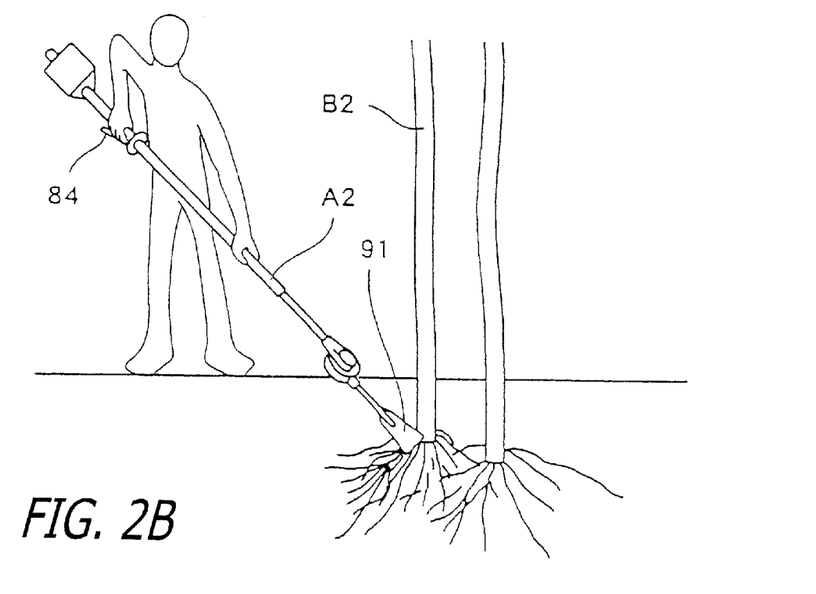
FIG. 2B is a view showing a state in which roots of plants are cut off by the root cutter whose basic structure is the same as the reaper of FIG. 1.

FIG. 2A shows a state in which fruit and branches of an oil palm B1 are cut off by the reaper A1 and FIG. 2B shows a state in which roots of a plant B2 are cut off by the root cutter A2.

Referring to FIG. 2A, an operator grips the first and second grip portions 82 and 83 by both hands, thereby supporting the reaper A1. One of operator's hands operates the operation lever 84 while gripping the first grip portion 82. Then, the operator presses the edge of the cutting blade 91 against the base portion of the branch and the stem portion of the fruit while adjusting an impact cycle by the operation of the operation lever 84, thereby cutting off the branches and the fruits by impact force.

Referring to FIG. 2B, the operator operates the operation lever 84 while supporting the reaper A2 by both hands. Then, the operator presses the edge of the cutting blade 91 against the root of the plant B2 in the ground while adjusting the impact cycle by the operation of the operation lever 84, thereby cutting off the root by the impact force.

Figure 3A:
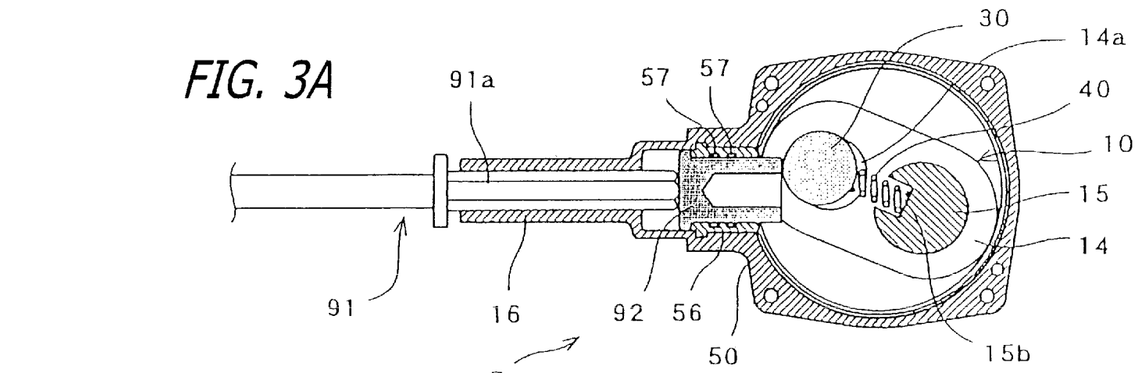
FIG. 3A is a transverse sectional view showing the impact generator.
Figure 3B:
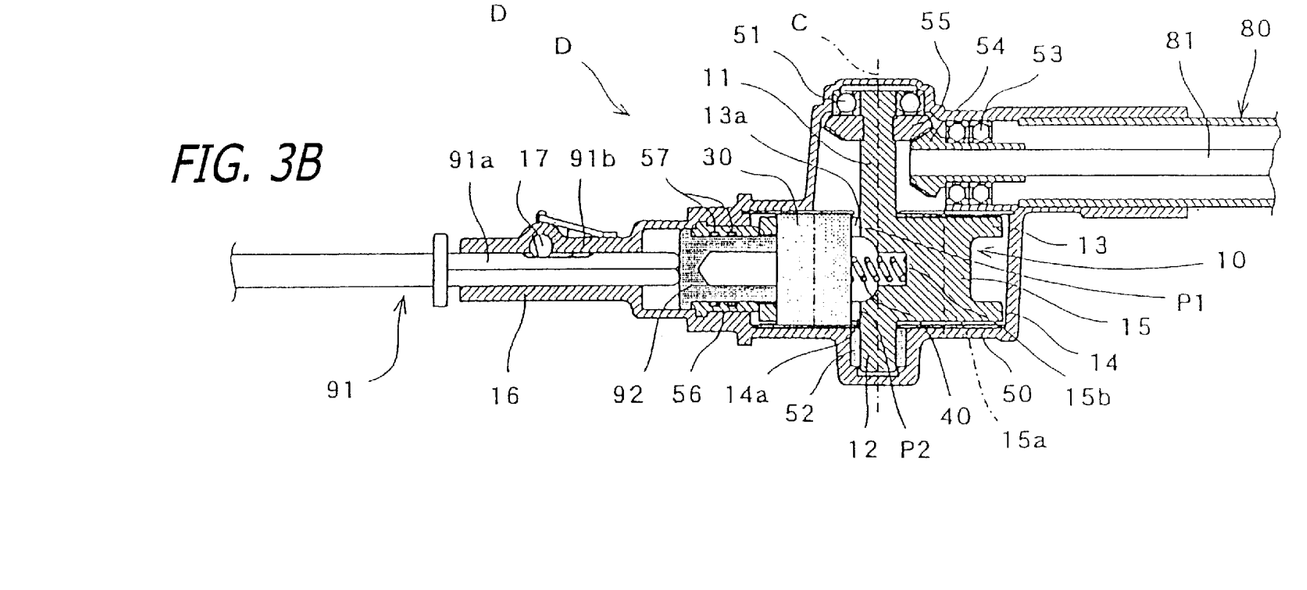
FIG. 3B is a longitudinal sectional view showing the impact generator.
Figure 4:
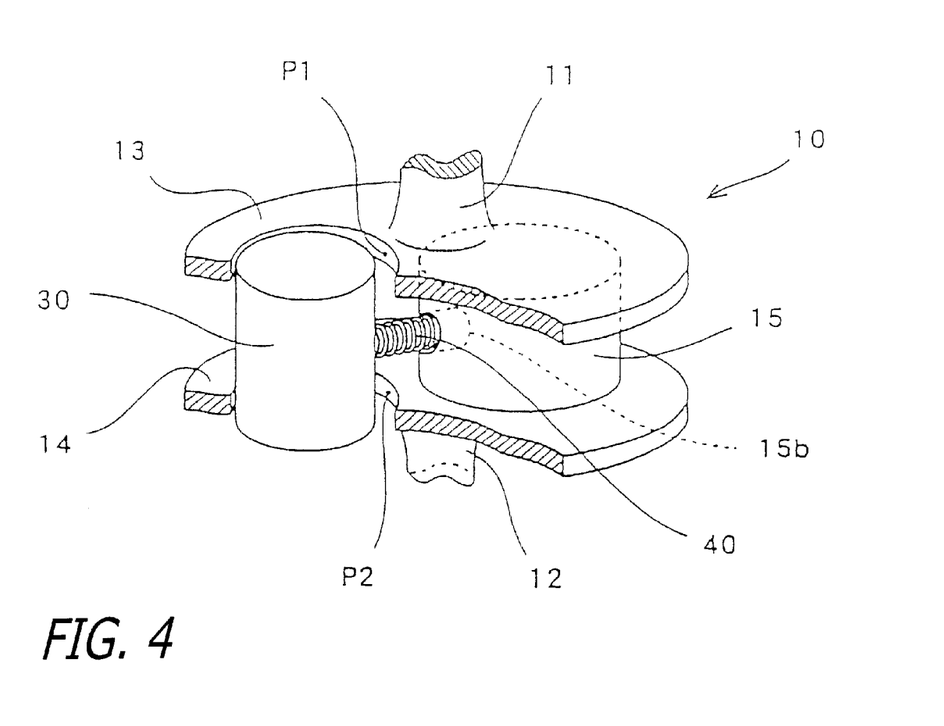
FIG. 4 is a perspective view showing main members of the impact generator, a part of which is cut away.

FIG. 3A is a transverse sectional view showing the impact generator D and FIG. 3B is a longitudinal sectional view showing the impact generator D. FIG. 4 is a perspective view showing main members of the impact generator D, a part of which is cut away.

The impact generator D mainly comprises a rotary member 10, a weight 30 and a coil spring 40 acting as a shock absorber. These members (the rotary member 10, the weight 30 and the coil spring 40) are accommodated in a casing 50. The cutting blade 91 is attached to the casing 50.

The rotary member 10 is rotatably supported on the casing 50. More specifically, the rotary member 10 has rotary shafts 11 and 12 protruded in a vertical direction (in FIG. 3B). The rotary shafts 11 and 12 are supported on the casing 50 through bearings 51 and 52. The bearing 51 supporting the upper rotary shaft 11 is a ball bearing, and the bearing 52 supporting the lower rotary shaft 12 is a needle bearing.

On the other hand, one of the ends of the drive shaft 81 penetrating the rod member 80 is supported by a ball bearing 53 fixed to the casing 50. The drive shaft 81 transmits rotating force generated by the engine 70 to the impact generator D. The drive shaft 81 and the rotary shaft 11 are connected to each other through a pair of gears 54 and 55. The gear 54 is a driving gear and the gear 55 is a driven gear. The rotating force of the drive shaft 81 is converted by about 90 degrees in a rotating direction through the gears 54 and 55, and is transmitted to the rotary member 10.

The rotary member 10 has upper and lower plate-shaped holding portions 13 and 14 provided in almost parallel with each other. The upper and lower plate-shaped holding portions 13 and 14 are connected to each other through a cylindrical connecting shaft portion 15. A central axis 15a of the connecting shaft portion 15 is positioned eccentrically from a center C of rotation of the rotary member 10.

Elliptical weight holding holes 13a and 14a are formed in the upper and lower plate-shaped holding portions 13 and 14, respectively. The weight 30 is held in the weight holding holes 13a and 14a. The weight 30 is almost cylindrical and has upper and lower end portions entering in the weight holding holes 13a and 14a, respectively. The weight holding holes 13a and 14a have diameters which are larger than the diameter of the weight 30. Therefore, the weight 30 can freely move to some extent in the weight holding holes 13a and 14a. More specifically, the weight 30 is movably held by the rotary member 10. The weight 30 performs a circular motion around the center C of rotation of the rotary member 10 by the rotation of the rotary member 10. The connecting shaft portion 15 has the function of acting as a balance weight for the weight 30 to perform a circular motion as well as the function of connecting the upper and lower plate-shaped holding portions 13 and 14.

The coil spring 40 acting as a shock absorber is provided between the weight 30 and the rotary member 10. A supporting hole 15b is formed in the connecting shaft portion 15, and one of ends of the coil spring 40 is fitted in the supporting hole 15b. Thus, the coil spring 40 is fixed to the connecting shaft portion 15. The other end of the coil spring 40 abuts against the side face of the weight 30.

A grease is put in the casing 50, in particular, around the gears 54 and 55 and the rotary member 10.

The tappet 92 acting as a struck member is accommodated in the casing 50 such that it can move in the axial direction thereof (in a right and left direction of FIGS. 3A and 3B). The struck member serves to directly receive striking force (impact force) from the weight 30 by the collision with the weight 30. The tappet 92 is supported on a bush 56 fixed into the casing 50. A portion between the bush 56 and the tappet 92 is sealed by an O ring 57 in order to prevent the grease in the casing 50 from leaking out. The casing 50 has a blade attaching portion 16 for attaching the cutting blade 91 thereto. The blade attaching portion 16 has an attaching hole in which the shank portion 91a of the cutting blade 91 is inserted. A notch portion 91b is formed on the side face of the shank portion 91a. The blade attaching portion 16 is provided with a clamp 17. The clamp 17 is engaged with the notch portion 91b for fixation. The cutting blade 91 can reciprocate in the axial direction thereof (in the right and left direction of FIGS. 3A and 3B) within a range in which the clamp 17 can interfere with the notch portion 91b. More specifically, the clamp 17 has the function of preventing the cutting blade 91 from coming off and the function of regulating the range of the reciprocation of the cutting blade 91. The tappet 92 interferes with the locus of the circular motion of the weight 30 when it is set in a rightmost position of FIGS. 3A and 3B within the moving range. Moreover, the tappet 92 does not interfere with the locus of the circular motion of the weight 30 when it is set in a leftmost position of FIGS. 3A and 3B within the moving range. Thus, the tappet 92 can reciprocate between an interference position where it interferes with the locus of the circular motion of the weight 30 and a noninterference position where it does not interfere with the locus of the circular motion of the weight 30.

In the impact generator D having the above-mentioned structure, when the rotary member 10 is rotated by the rotation of the drive shaft 81, the weight 30 held by the rotary member 10 is forced to the offside (outer side) of the weight holding holes 13a and 14a (on the side distant from the center of rotation of the rotary member 10 and the left side in FIGS. 3A and 3B) by centrifugal force and the force of the coil spring 40, and performs a circular motion around the axial core of the rotary member 10 in this state. When the weight 30 disposed at the offside of the weight holding holes 13a and 14a collides with the tappet 92 set in the interference position to strike the tappet 92 in the direction toward the noninterference position (to the left in FIGS. 3A and 3B), the tappet 92 gives an impact to the cutting blade 91. The cutting blade 91 and the tappet 92 try to move integrally in the direction toward the noninterference position (to the left in FIGS. 3A and 3B). The weight 30 is repelled in the direction toward the center C of rotation in the weight holding holes 13a and 14a upon receipt of a reaction from the tappet 92. Consequently, the coil spring 40 is contracted to absorb shock force generated between the weight 30 and the rotary member 10. The weight 30 repelled by the reaction of the tappet 92 collides with the points P1 and P2 on the internal walls defining the weight holding holes 13a and 14a which are the closest to the center C of rotation.

However, even if the collision is caused, the shock given to the rotary member 10 is relieved by the coil spring 40. Accordingly, the shock given to the rotary shafts 11 and 12 is relieved and the shock given to the bearings 51 and 52 is also reduced. Consequently, bearings having small load capacities can be employed for the bearings 51 and 52. Moreover, a vibration generated on the impact generator D is also reduced, resulting in a smaller noise. By regulating a vacancy of the weight holding holes 13a and 14a (a range in which the weight 30 can freely move) and the elastic force of the coil spring 40, the weight 30 can also be prevented from colliding with the points P1 and P2 on the internal walls defining the weight holding holes 13a and 14a.

When the tappet 92 is struck, the cutting blade 91 gives impact force to the branches of the plants and the like which are positioned on an edge. thereof and are objects for working. By the cutting blade 91 is pressed against the objects for working or receives a reaction from the objects for working, the cutting blade 91 is then pushed back to the right in FIGS. 3A and 3B. The tappet 92 moves to the interference position again and is then struck with the weight 30 which has taken a round. Thus, the striking force is continuously given to the tappet 92.

In the above mentioned embodiment, one coil spring 40 acting as a shock absorber has been provided in the almost central position of the connecting shaft portion 15 in the height direction in FIG. 3B. A plurality of coil springs, however, may be provided in a plurality of places of the connecting shaft portion 15 in the height direction. Moreover, the elastic force of the shock absorber can be caused to act on any position of the rotary member 10 where the shock given from the weight 30 to the rotary shafts 11 and 12 of the rotary member 10 can be absorbed. Furthermore, the elastic force of the shock absorber can be caused to act on the rotary member 10 and the weight 30 through a mediate member, that is, indirectly. In addition, the shock absorber may be constituted by a spring other than the coil spring or be constituted by using, as a main member, other elastic materials such as rubber and the like.

Numerous modifications and alternative embodiments of the invention will be apparent to those skilled in the art in view of the foregoing description. Accordingly, this description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. An impact generator, comprising:
 a rotary member rotatably supported by a rotary shaft for being rotated upon receipt of rotating force;
 a weight movably held by the rotary member for striking a struck member; and
 a shock absorber provided between the weight and rotary member for absorbing, by elastic force, a shock generated between the weight and the rotary member, wherein the rotary member has two plate-shaped holding portions provided in substantially parallel with each other for holding the weight and a connecting shaft portion for connecting the two plate-shaped holding portions in a position which is eccentric from the center of rotation of the rotary member, and
 the shock absorber is provided between the weight and connecting shaft portion and wherein the shock absorber is a coil spring, and a supporting hole for fitting one of the ends of the coil spring therein to support the coil spring is formed in the connecting shaft portion.

2. An apparatus having an impact generator driven by an associated engine for applying a striking force to an associated cutting blade, said impact generator comprising:

a rotary member rotatably supported by a rotary shaft for being rotated upon receipt of rotating force;

a weight movably held by the rotary member for striking a struck member; and a shock absorber provided between the weight and rotary member for absorbing, by elastic force, a shock generated between the weight and the rotary member, wherein the rotary member has two plate-shaped holding portions provided in substantially parallel with each other for holding the weight and a connecting shaft portion for connecting the two plate-shaped holding portions in a position which is eccentric from the center of rotation of the rotary member, and the shock absorber is provided between the weight and connecting shaft portion and wherein the shock absorber is a coil spring, and a supporting hole for fitting one of the ends of the coil spring therein to support the coil spring is formed in the connecting shaft portion.

* * * * *

UNITED STATES PATENT AND TRADEMARK OFFICE
CERTIFICATE OF CORRECTION

PATENT NO. : 6,481,509 B1
DATED : November 19, 2002
INVENTOR(S) : Yushiro Yamane et al.

It is certified that error appears in the above-identified patent and that said Letters Patent is hereby corrected as shown below:

<u>Title page,</u>
Item [30], Foreign Application Priority Data, should read:
-- April 26, 1999 (JP) ................... 11-118605 --

Signed and Sealed this

Fifteenth Day of April, 2003

JAMES E. ROGAN
*Director of the United States Patent and Trademark Office*